United States Patent
Hayashi

(10) Patent No.: US 8,794,779 B2
(45) Date of Patent: Aug. 5, 2014

(54) LIGHTING DEVICE, DISPLAY DEVICE AND TELEVISION RECEIVER

(75) Inventor: Keiji Hayashi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 523 days.

(21) Appl. No.: 13/142,293

(22) PCT Filed: Sep. 10, 2009

(86) PCT No.: PCT/JP2009/065829
§ 371 (c)(1),
(2), (4) Date: Jun. 27, 2011

(87) PCT Pub. No.: WO2010/082377
PCT Pub. Date: Jul. 22, 2010

(65) Prior Publication Data
US 2011/0273631 A1  Nov. 10, 2011

(51) Int. Cl.
*G02F 1/1335* (2006.01)
*G02F 1/1333* (2006.01)

(52) U.S. Cl.
CPC ........ *G02B 6/0091* (2013.01); *G02F 1/133615* (2013.01); *G02B 6/0068* (2013.01); *G02F 2001/133314* (2013.01); *G02F 1/133308* (2013.01); *G02F 1/133621* (2013.01)
USPC .......... 362/97.2; 362/97.1; 362/612; 362/613

(58) Field of Classification Search
USPC ................. 362/97.1–97.4, 612, 613
See application file for complete search history.

(56) References Cited

U.S. PATENT DOCUMENTS

| | | | | |
|---|---|---|---|---|
| 8,033,708 | B2 * | 10/2011 | Tsubaki | 362/612 |
| 8,342,730 | B2 * | 1/2013 | Tsubaki | 362/612 |
| 2007/0285944 | A1 | 12/2007 | Kiyohara et al. | |
| 2009/0231510 | A1 | 9/2009 | Takahashi | |
| 2012/0062816 | A1 * | 3/2012 | Tsubaki | 349/61 |
| 2012/0287666 | A1 * | 11/2012 | Kwon et al. | 362/602 |

FOREIGN PATENT DOCUMENTS

| | | | |
|---|---|---|---|
| JP | 2001-092370 A | 4/2001 | |
| JP | 2002-203418 A | 7/2002 | |
| JP | 2003-338214 A | 11/2003 | |
| RU | 2 122 242 C1 | 11/1998 | |
| WO | 2007/055059 A1 | 5/2007 | |

OTHER PUBLICATIONS

English translation of Official Communication issued in corresponding Russian Patent Application No. 2011128719, mailed on Sep. 4, 2012.
Official Communication issued in International Patent Application No. PCT/JP2009/065829, mailed on Dec. 22, 2009.

* cited by examiner

*Primary Examiner* — Anabel Ton
(74) *Attorney, Agent, or Firm* — Keating & Bennett, LLP

(57) ABSTRACT

A backlight unit 12 includes LED units 17, a light guide plate 18 and a follow-up mechanism. The light guide plate 18 has light entrance surfaces 18*b* and a light exit surface 18*a*. The light entrance surfaces 18*b* are provided so as to face the respective LED units 17. The light exit surface 18*a* is provided parallel to an arrangement direction in which the LED units 17 and the light entrance surface 18*b* are arranged (i.e., the Y-axis direction) and such that light exits therethrough. The follow-up mechanism is configured to move the LED unit 17U in the arrangement direction in response to a deformation of the light guide plate 18. The follow-up mechanism includes a support member 20 that supports the LED unit 17U. The support member is in contact with a surface of the light guide plate 18 along the light entrance surface 18*b*U.

18 Claims, 10 Drawing Sheets

LIGHTING DEVICE, DISPLAY DEVICE AND TELEVISION RECEIVER

TECHNICAL FIELD

The present invention relates to a lighting device, a display device and a television receiver.

BACKGROUND ART

In recent years, display components in image display devices including television receivers are being shifted from conventional cathode-ray tube display devices to thin display devices in which thin display components such as liquid crystal panels or plasma display panels are used. As a result, the image display devices are becoming thinner. Liquid crystal display devices require backlight units separately from liquid crystal panels because the liquid crystal panels do not emit light.

A technology for reducing the thickness of liquid crystal display devices disclosed in Patent Document 1 is known. A backlight unit disclosed in the document includes LEDs and a light guide plate. Each LED has a light-emitting surface through which light is emitted in a direction substantially parallel to a display surface of a liquid crystal panel. The light guide plate has a light entrance surface on a side (a side edge) so as to face the LED and a light exit surface on the top. Light from the LED enters the light guide plate through the light entrance surface and exits from the light exit surface toward the display surface of the liquid crystal display panel.

Patent Document 1: Japanese Published Patent Application No. 2001-92370

Problem to be Solved by the Invention

In the above-described backlight unit, when the LEDs are turned on or off, an ambient temperature inside the backlight unit changes. As a result, the light guide plate thermally expands or contracts. When the light guide plate thermally expands or contracts, relative positions between light sources and the light entrance surfaces may change. As a result, a rate of light that exits from each LED and enters through the light entrance surface and a rate of light that exits from the light exit surface may vary and brightness of the light guide plate may vary.

DISCLOSURE OF THE PRESENT INVENTION

The present invention was made in view of the foregoing circumstances. An object of the present invention is to stabilize the brightness.

Solution to Problem

The lighting device of the present invention includes at least one light source, a light guide member and a follow-up mechanism. The light guide member has a light entrance surface facing the light source and a light exit surface along an arrangement direction in which the light source and the light entrance surface are arranged. The follow-up mechanism is configured to move the light source in the arrangement direction in response to a deformation of the light guide member.

When the light guide member is deformed due to thermal expansion or contraction, the follow-up mechanism moves the light source in the arrangement direction in which the light source and the light entrance surface are arranged in response to the deformation of the light guide member. Therefore, a relative position between the light source and the light entrance surface is less likely to change in the arrangement direction. As a result, a rate of light that exits from the light source and enters through the light entrance surface and a rate of light that exits from the light exit surface remain stable. Therefore, brightness can be stabilized.

BEST MODE FOR CARRYING OUT THE INVENTION

First Embodiment

The first embodiment of the present invention will be explained with reference to FIGS. 1 to 6. In this embodiment, a liquid crystal display device 10 will be explained. X-axes, Y-axes and Z-axes in some drawings correspond to each other so as to indicate the respective directions. The X-axes and the Y-axes matches the horizontal direction and the vertical direction, respectively. In FIG. 2, the upper side and the lower side correspond to the front side and the rear side, respectively.

Figure 1:
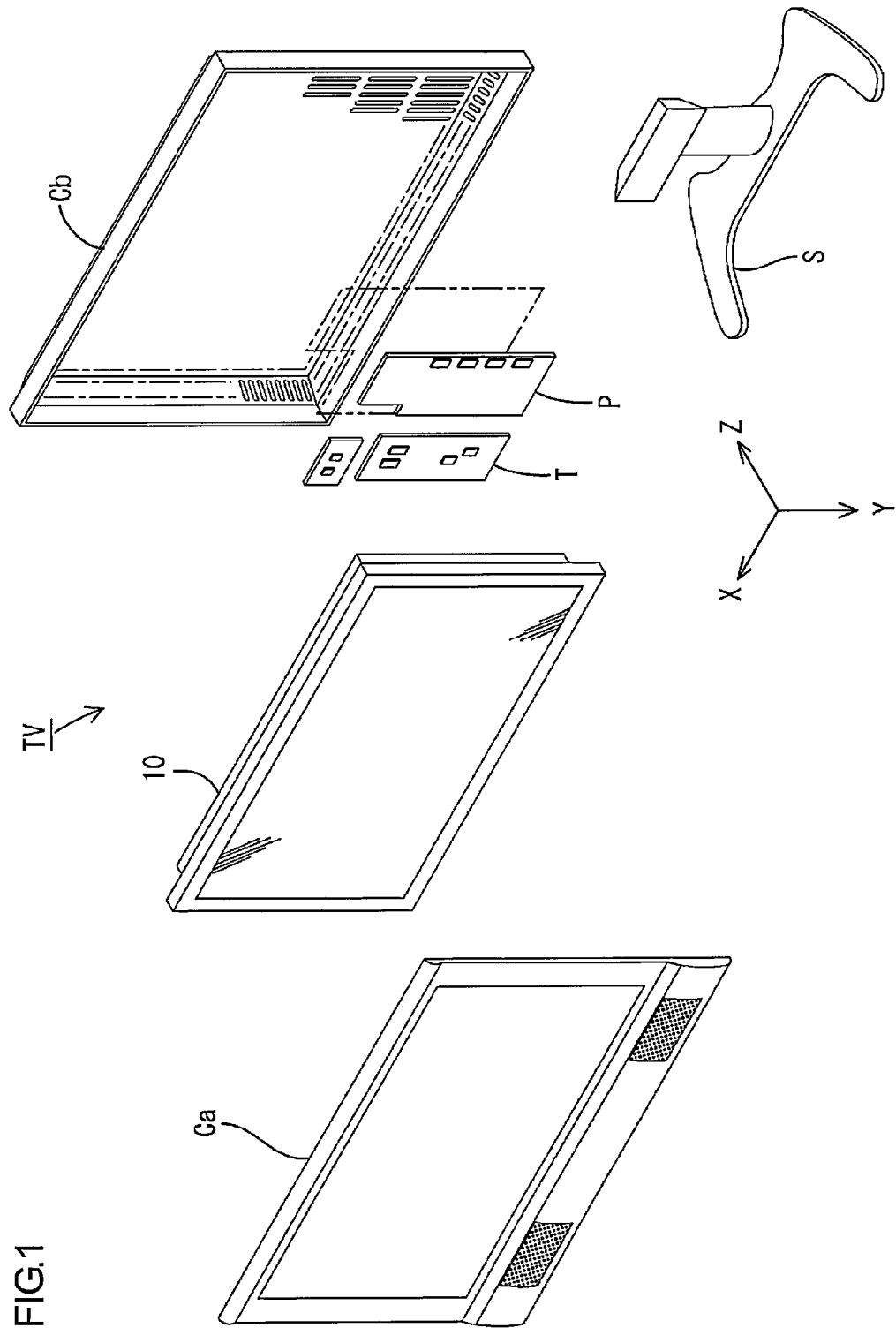
FIG. 1 is an exploded perspective view illustrating a general construction of a television receiver according to the first embodiment of the present invention.
Figure 2:
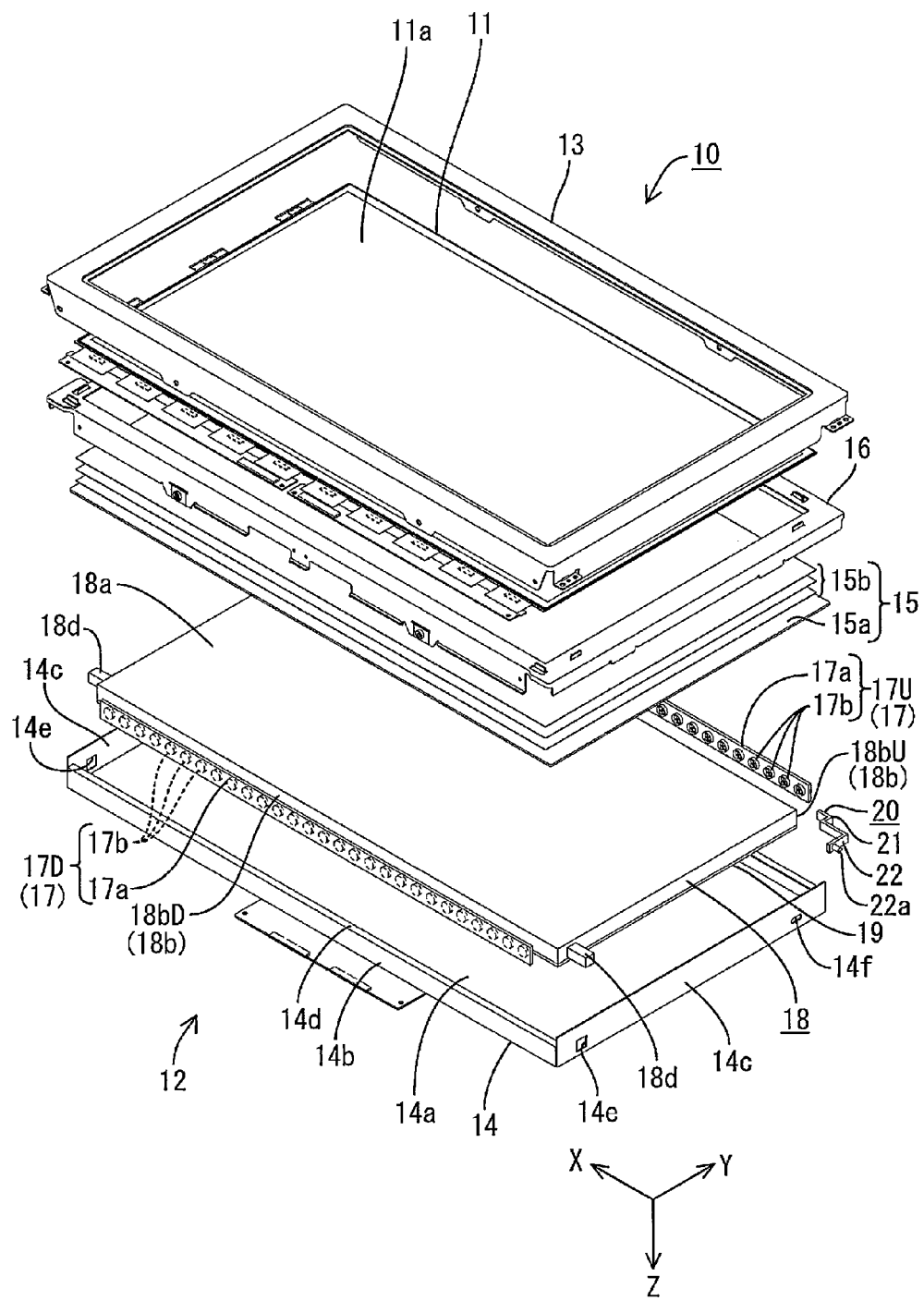
FIG. 2 is an exploded perspective view illustrating a general construction of a liquid crystal display device included in the television receiver.

As illustrated in FIG. 1, the television receiver TV includes the liquid crystal display device 10 (a display device), a front cabinet Ca, a rear cabinet Cb, a power source P, and a tuner T. The cabinets Ca and Cb sandwich the liquid crystal display device 10 therebetween. The liquid crystal display device 10 is housed in the cabinets Ca and Cb. The liquid crystal display device 10 is held by a stand S in a vertical position in which a display surface 11a thereof is set along the vertical direction (the Y-axis direction). The liquid crystal display device 10 has a landscape rectangular overall shape. As illustrated in FIG. 2, the liquid crystal display device 10 includes a liquid crystal panel 11, which is a display panel 11, and a backlight unit 12 (a lighting device), which is an external light source. The liquid crystal panel 11 and the backlight unit 12 are held together by a frame-shaped bezel 13.

"The display surface 11a thereof is set along the vertical direction" is not limited to a position in which the display surface 11a is set parallel to the vertical direction. The display surface 11a may be set along a direction closer to the vertical direction than the horizontal direction. For example, the display surface 11a may be 0° to 45° slanted to the vertical direction, preferably 0° to 30° slanted.

As illustrated in FIG. 2, the liquid crystal panel 11 in the liquid crystal display device 10 has a rectangular plan view. The long-side direction and the short-side direction of the liquid crystal panel 11 match the horizontal direction (the X-axis direction) and the vertical direction (the Y-axis direction), respectively. The liquid crystal panel 11 includes a pair of transparent glass substrates (having high optical transmissivity) bonded together with a predetermined gap therebetween and liquid crystals sealed between the substrates. On one of the glass substrates, switching components (e.g., TFTs), pixel electrodes and an alignment film are arranged. The switching components are connected to gate lines and the source lines that are perpendicular to each other. The pixel electrodes are connected to the switching components. On the other glass substrate, color filters including R (red) G (green) B (blue) color sections in predetermined arrangement, a counter electrode and an alignment film are arranged. Image data and various kinds of control signals for displaying images are feed from a drive circuit board, which is not shown, to the source lines, the gate lines and the counter electrode. Polarizing plates (not shown) are arranged on outer surfaces of the glass substrates, respectively.

Figure 3:
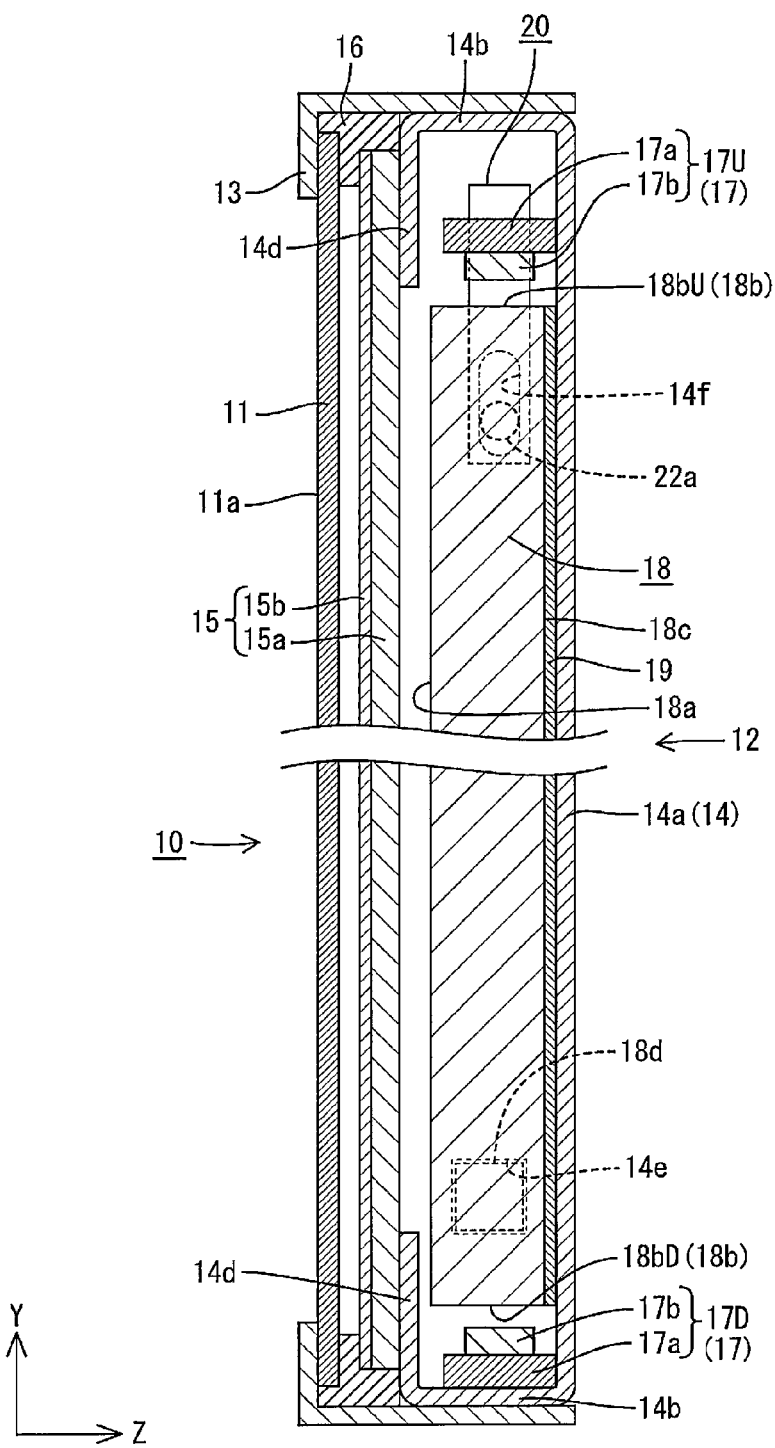
FIG. 3 is a cross-sectional view of the liquid crystal display device along the short side thereof.

As illustrated in FIGS. 2 and 3, the backlight unit 12 includes a chassis 14, an optical member 15 and a pair of frames 16. The chassis 14 has a box-like overall shape and an opening on the front side (the light exit side, the liquid crystal panel 11 side). The optical member 15 is arranged so as to cover the opening. The optical member 15 is arranged with the long sides thereof along the long sides of the chassis 14. The frames 16 and the chassis 14 hold the long sides of the optical member 15 therebetween. Furthermore, the chassis 14 houses a pair of LED units 17 and a light guide plate 18. The LED units 17 are arranged on the respective long-side outer edges of the chassis 14 and configured to emit light. The light guide plate 18 is arranged between the LED units 17 and configured to guide rays of the light from the LED units 17 toward the liquid crystal panel 11. In this embodiment, so-called edge light (or side light) configuration is used for the backlight unit 12. The light guide plate 18 and the optical member 15 are arranged closely below the liquid crystal panel 11a, and the LED units 17, which are light sources, are arranged on side edges of the light guide plate 18.

The chassis 14 is made of metal, for instance, aluminum-contained material. The chassis 14 includes a bottom plate 14a and side plates 14b and 14c. The bottom plate 14a has a rectangular shape in plan view. The side plates 14b rise from the long-side outer edges of the bottom plate 14a toward the front side and the side plates 14c rise from the short-side outer edges of the bottom plate 14a toward the front side. The long-side direction and the short-side direction of the bottom plate 14a match the horizontal direction (the X-axis direction) and the vertical direction (the Y-axis direction), respectively. As illustrated in FIG. 3, projecting plates 14d project inward (toward the light guide plate 18) from the long side plates 14b that rise from the long sides edge (upper and lower outer edges) of the bottom plate 14a. Namely, the long-side outer edges of the chassis 14 are folded and insides thereof are holding spaces for housing the LED units 17. A space of the chassis 14 between the spaces for housing the LED units 17 is a light guide plate 18 holding space. The long side outer edges of the optical member 15 are placed on the front surfaces of the projecting plates 14d. A power supply board for supply power to the LED units 17 is mounted to the rear surface of the bottom plate 14a.

The optical member 15 has a rectangular shape similar to the liquid crystal panel 11 or the bottom plate 14a of the chassis 14 includes a diffuser 15a and a plurality of optical sheets 15b arranged on the front side of the diffuser 15a. The diffuser 15a includes a synthetic resin base plate with light-scattering particles scattered in the base material. The diffuser 15a is configured to diffuse rays of light emitted from the LED units 17 and guided by the light guide plate 18. The optical sheets 15b include a diffusing sheet, a lens sheet and a reflection-type polarizing sheet are arranged in this order from the diffuser 15a side. They are configured to make the rays of light emitted from the LED units 17 and passed through the diffuser 15a into planar light.

The frames 16 are made of metal and form a frame shape along the outer edges of the liquid crystal panel 11 and the optical member 15. The outer edges of the optical member 15 are sandwiched between the frames 16 and the projecting plates 14d (see FIG. 3). The frames 16 support the outer edges of the liquid crystal panel 11 from the rear side. The outer edges of the liquid crystal panel 11 are sandwiched between the frames 16 and the bezel 13 that is arranged on the front side (see FIG. 3).

Figure 4:
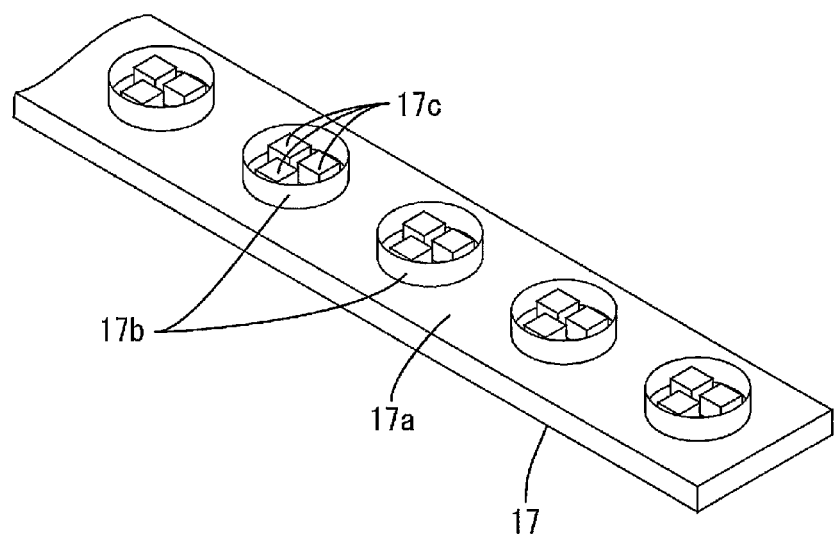
FIG. 4 is a perspective view illustrating a general construction of an LED unit.

Each LED unit 17 includes an LED board 17a and a plurality of LEDs 17b (Light Emitting Diodes) mounted on a surface of the LED board 17a. The LED board 17a includes a base plate made of metal such as aluminum-contained material same as the chassis 14 and wiring patterns formed on the surface of the base plate via an insulation layer. The wiring patterns are metal films such as copper foils. The LED board 17a has an elongated plate-like shape that extends along the X-axis direction, that is, the long side of the chassis 14. As illustrated in FIG. 2, the LEDs 17b are arranged in line on the surface of the LED board 17a along the long side of the LED board 17a (the X-axis direction). Distances between the LEDs 17b are substantially equal, that is, the LEDs 17b are arranged at equal intervals. As illustrated in FIG. 4, each LED 17b includes three LED chips 17c, each of which emits a single color light of red (R), green (G) or blue (B). The LED chips 17c are fixed by resin adhesion.

Figure 5:
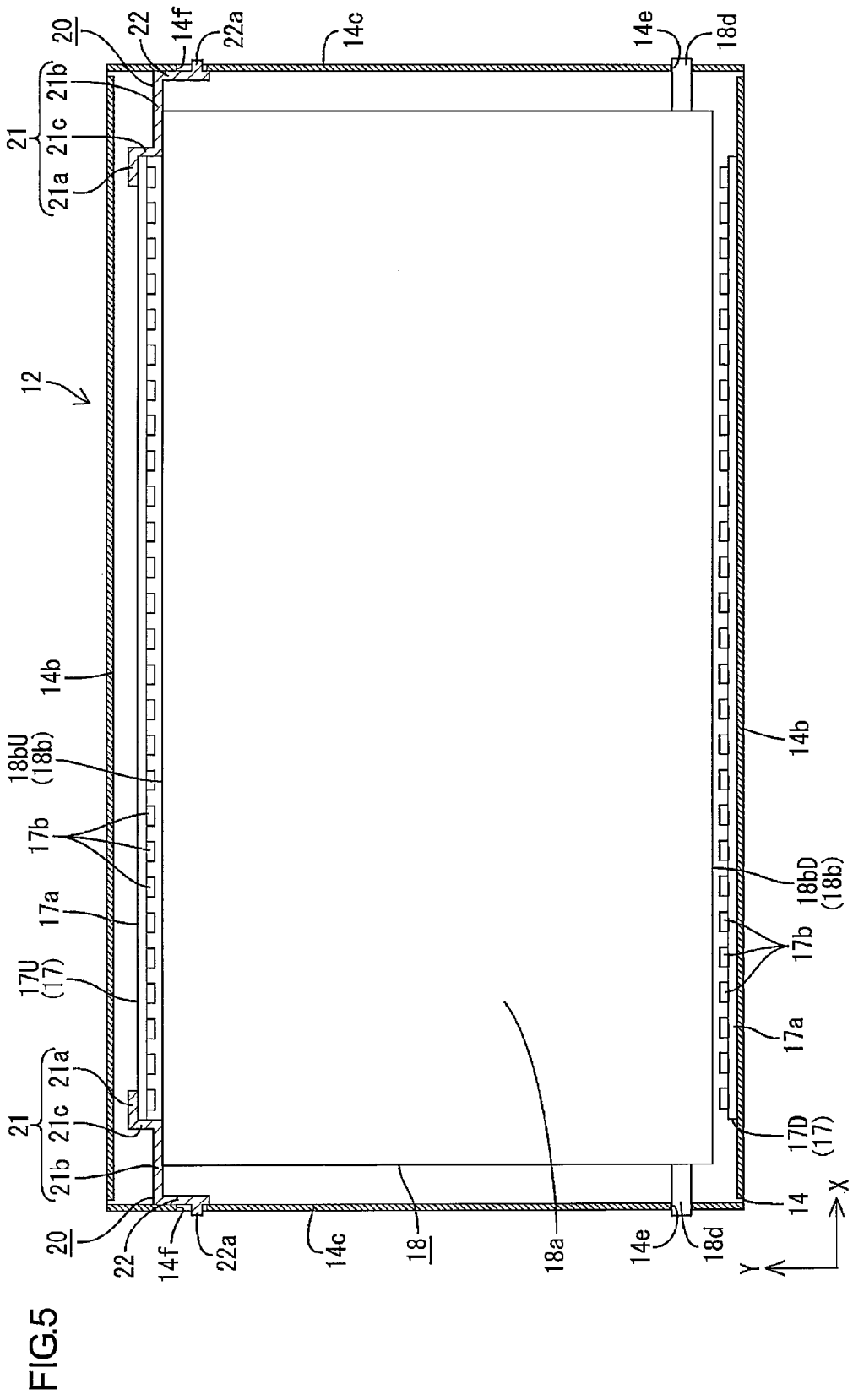
FIG. 5 is a cross-sectional view of a backlight unit.

As illustrated in FIG. 5, the LED units 17 having the above configuration are arranged at the respective long-side outer edges of the chassis 14. Namely, they are arranged on the upper side and the lower side of the vertical dimension (along the Y-axis direction) such that the light guide plate 18 is sandwiched therebetween. To distinguish the LED units 17 from each other in the following description, letter U is added to the symbol indicating the upper LED unit 17 and letter D is added to the symbol indicating the lower LED unit 17. When they are explained without distinguishing from each other, those letters are not added. The upper and lower LED units 17 are arranged opposite to each other such that light-emitting surfaces of the LEDs 17b are opposed and light axes of the LEDs 17b are parallel to the Y-axis direction. The LED units 17 are arranged such that mounting surfaces of the LED boards 17 on which the LEDs 17b are mounted are parallel to the horizontal direction (the X-axis direction) and the light-emitting surfaces of the LEDs 17b are opposed to the light guide plate 18. The upper LED unit 17U is mounted at a position a predetermined distance from the long side plate 14b of the chassis 14 opposed thereto and located on the upper side. The lower LED unit 17D is mounted so as to be in contact with the long side plate 14b opposed thereto and located on the lower side.

The light guide plate 18 is made of synthetic resin having high transparency such as acrylic resin. The light guide plate 18 is formed in a plate-like shape having a rectangular plan view similar to the optical member 15 and a predetermined thickness. The light guide plate 18 is arranged between the LED units 17 that face each other such that a main plate surface is on the front, that is, the main plate surface faces the diffuser 15a. The main plate surface is a light exit surface 18a through which light inside the light guide plate 18 exits toward the optical member 15 and the liquid crystal panel 11. The light exit surface 18a is parallel to the display surface 11a of the liquid crystal panel 11, that is, parallel to the X-axis direction and the Y-axis direction. Long-side surfaces along the X-axis direction among outer surfaces of the light guide plate 18 face the respective LED units 17. The long-side surfaces are light entrance surfaces 18b through which light emitted from the LED units 17 enters. The light entrance surfaces 18b are provided on an upper surface of the light guide plate 18 and the bottom surface of the light guide plate 18 (the upper end and the lower end of the Y-axis dimension). To distinguish the light entrance surfaces 18b from each other in the following description, letter U is added to the symbol indicating the upper light entrance surfaces 18b and letter D is added to the symbol indicating the lower light entrance surfaces 18b. When they are explained without distinguishing from each other, those letters are not added. The light entrance surfaces 18b are parallel to the X-axis direction and the Y-axis direction. They are substantially perpendicular to the light exit surfaces 18a. Each LED unit 17 (or each LED 17b) and the corresponding light entrance surface 18b are arranged relative to each other in the Y-axis direction and parallel to the light exit surface 18a. A predetermined gap is provided between each light entrance surface 18b and the corresponding LED unit 17 so as to separate them in the Y-axis direction. The gap compensates for assembly errors.

A reflection sheet 19 is arranged on the rear surface 18c of the light guide plate 18, that is, the surface 18c opposite from the light exit surface 18a. The reflection sheet 19 is configured to reflect light that travels through the light guide plate 18 to the front, that is, to the light exit surface 18a. Namely, the reflection sheet 19 has a function to increase outgoing rays of light. With the light guide plate 18, the rays of light emitted from the LED units 17 enter the light guide plate 18 through the light entrance surface 18b, travel through the light guide plate 18 and then exit from the light exit surface 18a that faces the diffuser 15a. Therefore, the liquid crystal panel 11 is illuminated from the back.

The light guide plate 18 having the above configuration is fixed to the chassis 14 with fixtures that will be explained next. The light guide plate 18 has fixing pins 18d that project to the sides at lower sections of the short side surfaces, respectively. The fixing pins 18d are located close to the lower light entrance surface 18b of the light guide plate 18 (relatively closer to the lower light entrance surface 18b than the upper light entrance surface 18b). They are at substantially the same Y-axis position. The chassis 14 has fixing holes 14e in the lower part of the short side plates 14c, respectively. The fixing holes 14e receive the fixing pins 18d. The fixing pins 18d are closely fitted in the respective fixing holes 14e and thus the light guide plate 18 is fixed to the chassis 14 without backlashes in the vertical direction (the Y-axis direction).

When the liquid crystal display device 10 is in use, an ambient temperature inside the liquid crystal display device 10 changes. According to the temperature change, the components of the liquid crystal display device 10 thermally expand or contract. Especially, the light guide plate 18 is a large in size and made of resin having relatively a higher coefficient of thermal expansion than that of metal. Therefore, an amount of thermal expansion or contraction of the light guide plate 18 is larger than those of other components. The following problem may occur. When the light guide plate 18 thermally expands or contracts, it changes the X-axis dimension and the Y-axis dimension, that is, it expands or contracts in directions along the light exit surface 18a. Such a two-dimensional deformation occurs with the fixing pins 18d, which are fixing points to the chassis 14, as points of origin. When the light guide plate 18 thermally expands or contracts, the short-side surfaces change their positions in the horizontal direction (the X-axis direction) with the fixing pins 18d as points of origin. Moreover, the upper long-side surface of the long-side surfaces (or the light entrance surface 18bU) changes its position in the vertical direction (the Y-axis direction). The lower long-side surface of the long-side surfaces (or the light entrance surface 18bD) is located close to the fixing pins 18d in the vertical direction. Therefore, it is less likely to change its position. The gap between the upper light entrance surface 18bU and the LED unit 17U that is opposed thereto may increase or decrease in size. In that case, a rate of light that exits from each LED 17b and enters through the light entrance surface 18bU and a rate of light that exits from the light exit surface 18a may vary. As a result, brightness may vary. Four corners of the light guide plate 18 may be fixed to the chassis 14 to restrict the deformation of the light guide plate 18 due to thermal expansion or contraction. However, the light guide plate 18 may be three-dimensionally deformed with the fixing points as points of origin, for example, it may be deflected or warped. Moreover, a squeak noise may be generated.

To solve the above problem, a follow-up mechanism is provided. The follow-up mechanism is configured to move the LED unit 17U according to the expansion or contraction of the light guide plate 18. As illustrated in FIG. 5, the follow-up mechanism is provided only for the upper LED unit 17U that may be affected by the expansion or contraction of the light guide plate 18. The follow-up mechanism includes support members 20 for supporting the LED unit 17U. The support members 20 are made of metal, for example, aluminum-contained material, which is the same material as that of the chassis 14. Coefficients of thermal expansion of the support members 20 and the chassis 14 are equal and lower than that of the light guide plate 18 made of resin.

Each support member 20 has a crank-like shape in plan view. It includes a main portion 21 and an extending portion 22. One of ends of the main portion 21 is connected to the LED unit 17U. The extending portion 22 projects from the other end of the main portion 21. The main portion 21 includes a pair of horizontal plates 21a and 21b along the X-axis direction and a vertical plate 21c along the Y-axis direction. The vertical plate 21c is connected to the ends of the horizontal plates 21a and 21b. The inner horizontal plate 21a is attached to a surface of the LED board 17a of the LED unit 17U opposite from the mounting surface on which the LEDs 17b are mounted. The outer horizontal plate 21b of the main portion 21 is in contact with the upper surface of the light guide plate 18, that is, the side edge of the upper light entrance surface 18bU. Specifically, a bottom surface of more than inner half of the outer horizontal plate 21b is in surface contact with the side edge of the upper light entrance surface 18bU of the light guide plate 18. When the light guide plate 18 thermally expands, the upper light entrance surface 18bU moves upward relative to the chassis 14. The support member 20 and the LED unit 17U are pushed up by the light entrance surface 18bU and move in the same direction by the same amount (or the same distance). When the expanded light guide plate 18 thermally contracts, the upper light entrance surface 18bU moves downward relative to the chassis 14. The support member 20 and the LED unit 17U move in the same direction by the same amount by gravity according to the thermal contraction. With the support member 20 being in contact with the light entrance surface 18bU that face upward, the LED unit 17U automatically moves according to the thermal expansion or contraction of the light guide plate 18. Therefore, the Y-axis position of the LED unit 17U relative to the light entrance surface 18bU remains constant.

The extending portion 22 projects downward from the end of the outer horizontal plate 21b of the main portion 21 and extends along the short side plate 14c of the chassis 14. The extending portion 22 extends along the Y-axis direction and the outer surface thereof is in contact with the short side plate 14c. A clearance is provided between the inner surface of the extending portion 22 and the side surface of the light guide plate 18 at an end of the X-axis dimension. The clearance allows the thermal expansion of the light guide plate 18 in the X-axis direction. The extending portions 22 and the chassis 14 include a guide mechanism for guiding the movement of the support members 20 relative to the chassis 14. As illustrated in FIGS. 3 and 5, the guide mechanism includes guide pins 22a and guide holes 14f. Each guide pin 22a is a protrusion provided on the extending portion 22. Each guide hole 14f is a hole formed in the short side plate 14c of the chassis 14 for receiving the guide pin 22a. The guide rib 22a projects outward from the outer surface of the extending portion 22 along the X-axis direction and has a substantially cylindrical rod shape. The guide hole 14f is a through hole that extends (or opens) trough the short side plate 14c of the chassis 14 in the thickness direction of the plate. It has a substantially oval shape when the chassis 14 is viewed from the side. The short axis and the long axis of the guide hole 14f are along the Z-axis direction and the Y-axis direction, respectively. The short dimension of the guide hole 14f is substantially equal to the diameter of the guide pin 22a. The long dimension of the guide hole 14f is larger than the diameter of the guide pin 22a. When the guide pin 22a is fitted in the guide hole 14f, predetermined clearances are provided in the Y-axis direction between the guide pin 22a and the edge of the guide hole 14f. Because the support members 20 and the chassis 14 are made of the same material, the guide pins 22a can be fitted in the guide holes 14f with high dimensional accuracy, and backlashes are less likely to occur even when thermal expansion or contraction occurs.

This embodiment has the above configuration. Next, functions of this embodiment will be explained. When the liquid crystal display device 10 is tuned on and the LEDs 17b of the LED units 17 are turned on, the LEDs 17b generate heat. As a result, the temperature inside the backlight unit 12 increases and the light guide plate 18 thermally expands. The light guide plate 18 thermally expands with the fixing points of the light guide plate 18 to the chassis 14, that is, the fixing pins 18d, as points of origin. The amount of the thermal expansion of the light guide plate 18 in the vertical direction is proportional to the distance from the fixing pins 18d that are the points of origin of the thermal expansion.

Figure 6:
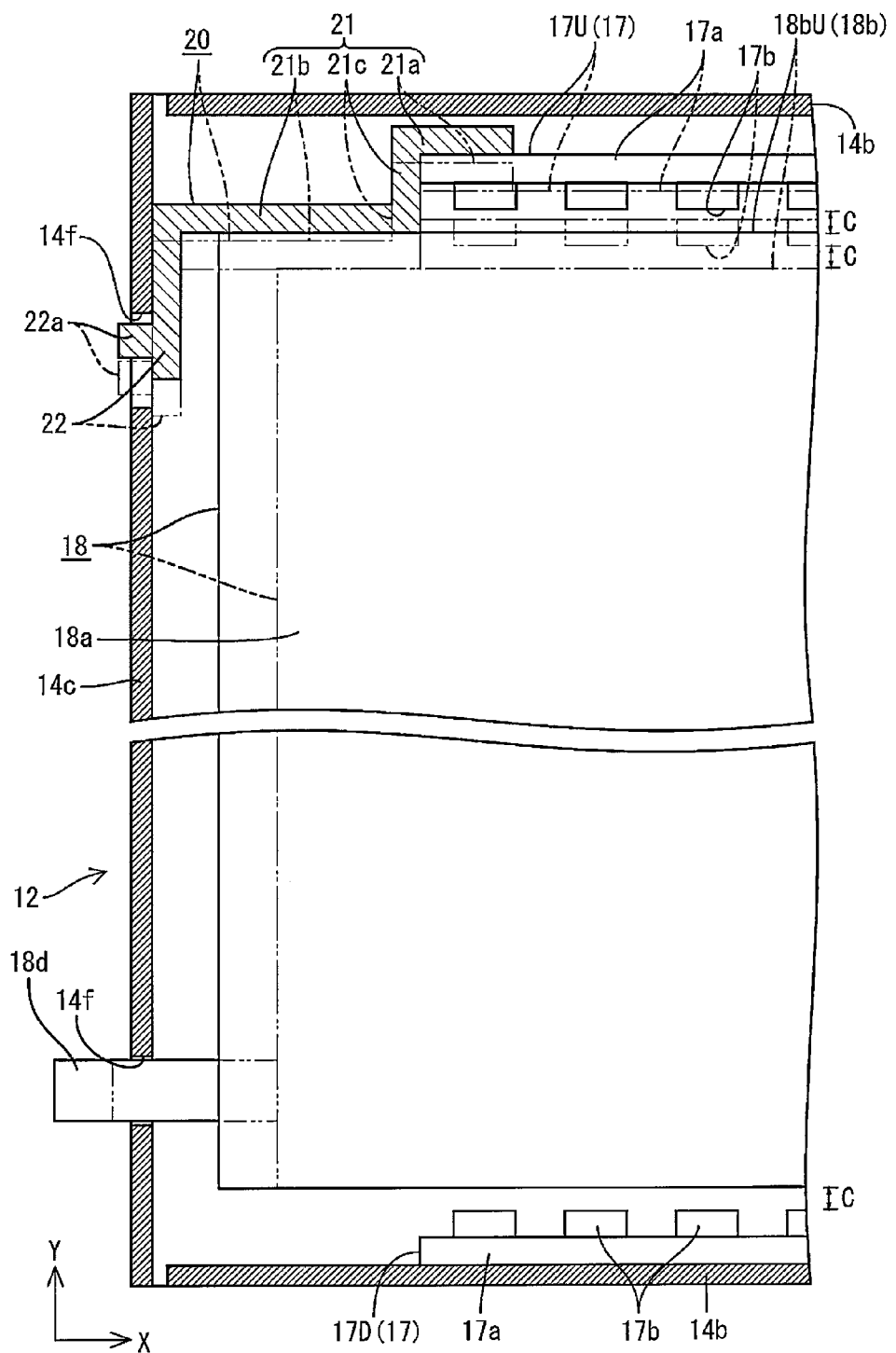
FIG. 6 is a magnified cross-sectional view of the backlight unit in a thermally expanded state.

When the light guide plate 18 thermally expands from a state indicated by two-dot chain lines in FIG. 6, both side surface at the ends of the horizontal dimension (the X-axis dimension) move outward and the upper surface (including the light entrance surface 18bU) at the upper end of the vertical dimension (the Y-axis dimension) moves upward as indicated by solid lines. However, the bottom surface (including the light entrance surface 18bD) at the bottom end of the vertical dimension close to the fixing pins 18d is less likely to move. In FIG. 6, the solid lines indicate the components after thermal expansion (before thermal contract) and the two-dot chain lines indicate the components before thermal expansion (after thermal contraction). Because the outer vertical plates 21b of the support members 20 are in contact with the upper surface of the light guide plate 18, they are pushed up by the upper surface of the light guide plate 18. Therefore, the support members 20 move upward by the same amount that the upper surface of the light guide plate 18 moves in response to the movement of the upper surface of the light guide plate 18. Furthermore, the support members 20 also support the upper LED unit 17U and thus the upper LED unit 17U also moves upward by the amount that the upper surface of the light guide plate 18 moves. Before and after the thermal expansion, a size of a gap C between each LED 17b in the LED unit 17U and the light entrance surface 18bU at the upper end of the vertical dimension of the light guide plate 18, that is, the relative vertical position, is less likely to change and remains constant. Even when the light guide plate 18 thermally expands, the rate of light that enters through the light entrance surface 18bU that faces each LED 17b and the rate of light that exits from the light exit surface 18aU remain stable. The brightness can be stabilized.

The gap C between the upper LED unit 17U and the light entrance surface 18bU that faces the upper LED unit 17U is substantially equal to the gap C between the lower LED unit 17D and the light entrance surface 18bD that faces the lower LED unit 17D. The rate of light that exits from the LED unit 17U and enters through the light entrance surface 18bU and the rate of light that exits from the LED unit 17D and enters through the light entrance surface 18bD are substantially equal. Therefore, uniform in-plane distribution of the amount of light that exits from the light exit surface 18a can be achieved, and uneven brightness is preferably reduced.

When the support members 20 move in response to the movement of the light guide plate 18, the outer surfaces of the extending portions 22 of the support members 20 slide over the inner surfaces of the short side plates 14c of the chassis 14. Moreover, the outer peripheries of the guide pins 22a slide over the inner walls of the guide holes 14f. The support members 20 move without backlashes between the support members 20 and the chassis 14 in the X-axis direction and the Y-axis direction, that is, in directions perpendicular to the moving direction. The movements of the support members 20 and the LED unit 17U in the vertical direction relative to the chassis 14 are smoothly guided. Furthermore, because the support members 20 and the chassis 14 are made of the same material, the guide pins 22a can be fitted in the guide holes 14f with high dimensional accuracy. Moreover, backlashes are less likely to occur even when the support members 20 and the chassis 13 thermally expand. Therefore, the guide functions can be stably performed.

When the liquid crystal display device 10 is turned on, only some of the LEDs 17b may be continuously turned on. If pulse width modulation is used, a ratio of turn-on time to turn-off time is varied by periodically turning on and off the LEDs 17b. The temperature inside the backlight unit 12 increases or decreases according to states of the LEDs 17b. If the temperature decreases, the light guide plate 18 thermally contracts. Namely, the light guide plate 18 may thermally contract while images are displayed on the liquid crystal display device 10. When the light guide plate 18 thermally contract from the state indicated by the solid lines in FIG. 6, both side surfaces at the ends of the horizontal dimension move inward and the upper surface (including the light entrance surface 18bU) at the upper end of the vertical dimension moves downward as indicated by the two-dot chain lines. The outer horizontal plates 21b of the support members 20 are in contact with the upper surface of the light guide plate 18. When the upper surface of the light guide plate 18 moves downward due to the thermal contraction, the support members 20 and the LED unit 17U supported by the support members 20 move downward due to gravity by the same amount that the upper surface of the light guide plate 18 moves in response to the movement of the upper surface. Before and after the thermal contraction, the size of the gap C between each LED 17b in the LED unit 17U and the light entrance surface 18bU at the upper end of the vertical dimension of the light guide plate 18, that is, the relative vertical position, is less likely to change and remains constant. Even when the light guide plate 18 thermally contracts, the rate of light that enters through the light entrance surface 18bU that faces each LED 17b and the rate of light that exits from the light exit surface 18aU remain stable. Therefore, brightness can be stabilized. During the thermal contraction, the movements of the support members 20 are smoothly guided by the guide pins 22a and the guide holes 14f, as during the thermal expansion.

As described above, the backlight unit 12 of this embodiment includes the LED units 17, the light guide plate 18 and the follow-up mechanism. The light guide plate 18 has the light entrance surfaces 18b and the light exit surface 18a. The light entrance surfaces 18b face the LED units 17. The light exit surface 18a is parallel to the arrangement direction in which the LED units 17 and the light entrance surfaces 18b are arranged (i.e., the Y-axis direction) and configured such that light exits therethrough. The follow-up mechanism is configured to move the LED unit 17U in the arrangement direction in response to the deformation of the light guide plate 18.

If the light guide plate 18 is deformed due to thermal expansion or contraction, the follow-up mechanism moves the LED unit 17U in the arrangement direction in which the LED unit 17U and the light entrance surface 18bU (i.e., the Y-axis direction) in response to the deformation of the light guide plate 18. The relative position between the LED unit 17U and the light entrance surface 18bU in the arrangement direction is less likely to change. Therefore, the rate of light that enters through the light entrance surface 18bU that faces each LED 17b and the rate of light that exits from the light exit surface 18aU remain stable.

Four corners of the light guide plate 18 may be fixed to the chassis 14 to restrict the deformation of the light guide plate 18 due to thermal expansion or contraction. However, the light guide plate 18 may be three-dimensionally deformed with the fixing points as points of origin, for example, it may be deflected or warped. This may cause problems including uneven brightness. In this embodiment, the light guide plate 18 is fixed at one point with regard to the arrangement direction in which the LED unit 17U and the light entrance surfaces 18bU are arranged (i.e., the Y-axis direction). Namely, the thermal expansion or contraction of the light guide plate 18 in the arrangement direction in which the LED unit 17U and the light entrance surfaces 18bU are arranged is allowed. Therefore, the light guide plate 18 is less likely to be deflected or warped.

The follow-up mechanism includes support members 20 for supporting the LED unit 17U. The support members 20 are in contact with the surfaces of the light guide plate 18 parallel to the light entrance surface 18bU. If the light guide plate 18 is deformed due to thermal expansion, the light entrance surface 18bU moves to the LED unit 17U side. The support members 20 that are in contact with the surfaces of the light guide plate 18 parallel to the light entrance surface 18bU also move in the same direction in response to the movement of the light entrance surface 18bU. Therefore, the relative position between the LED unit 17U and the light entrance surface 18bU remains constant.

The LED unit 17U is arranged on the upper side in the vertical direction than the light guide plate 18 and the support members 20 that support the LED unit 17U are in contact with the upper surface of the light guide plate 18. If the light guide plate 18 is deformed due to thermal contraction, the support members 20 that are in contact with the upper surface of the light guide plate 18 move due to gravity in response to the movement of the light guide plate 18. Therefore, the support members 20 do not need to be fixed to the light guide plate 18 and this makes the assembly work easier.

The chassis 14 for housing the LED units 17 and the light guide plate 18 is provided. The guide mechanism for guiding the movements of the support members relative to the chassis 14 is provided in the chassis 14 and the support members 20. With this configuration, the movements of the support members 20 relative to the chassis 14 are smoothly guided by the guide mechanism. This is especially useful in this embodiment in which the support members 20 are not fixed to the light guide plate 18 and thus the movements of the support members 20 in response to the movement of the light guide plate 18 tend to be unstable.

The guide mechanism includes the guide pins 22a and the guide holes 14f. The guide pins 22a are included in the support members 20. The guide holes 14f are formed in the chassis 14 and the guide pins 22a fitted therein. The clearances are provided between the guide pins 22a and the edges of the guide holes 14f. With this configuration, the movements of the support members 20 relative to the chassis 14 can be guided within ranges corresponding to the clearances between the guide pins 22a and the edges of the guide holes 14f.

Each support member 20 includes the extending portion 22 that extends along the wall surface of the chassis 14. Each extending portion includes the guide pin 22a. With this configuration, the movements of the support members 20 are further stabilized by the extending portions 22 that extend along the wall surfaces of the chassis 14.

The chassis 14 includes the bottom plate 14a and the side plates 14b and 14c. The bottom plate is arranged on an opposite side of the light guide plate 18 from the light exit surface 18a. The side plates 14b and 14c rise from the outer edges of the bottom plate 14a. The guide holes 14f are formed in the side plates 14c. With this configuration, the thickness can be reduced in comparison to a configuration in which guide holes are formed in the bottom plate 14a of the chassis 14.

Each guide pin 22a is a protrusion and each guide hole 14f is a recess for receiving the guide pin 22a. By fitting the guide pins 22a that are protrusions in the guide holes 14f that are recesses, the guide mechanism is prepared.

The support members 20 are made of the same material as that of the chassis 14. Therefore, the components of the guide mechanism are fitted together with high accuracy. Even when the support members 20 and the chassis 14 thermally expand or contract, the guide mechanism is less likely to produce backlashes. Therefore, the relative positions between the LED units 17 and the light entrance surfaces 18b are less likely to change.

The support members 20 are made of material having a coefficient of thermal expansion lower than that of the light guide plate 18. Even when the support members 20 thermally expand or contract, the relative positions between the LED units 17 and the light entrance surfaces 18b are less likely to change.

The LED units 17 are arranged so as to face each other via the light guide plate 18 sandwiched therebetween. The light guide plate 18 has the light entrance surfaces that face the respective LED units 17. With this configuration, rays of light from the LED units 17 that are arranged so as to face each other via the light guide plate 18 enter the respective light entrance surfaces 18b. Therefore, the uniform in-plane distribution of rays of light that exits from the light exit surface 18a can be achieved.

The chassis 14 for housing the LED units 17 and the light guide plate 18 is provided. The end of the light guide plate 18 on the side close to the LED unit 17D of the LED units 17 is fixed to the chassis 14. The other LED unit 17U of the LED units 17 is movable by the follow-up mechanism. Because the end of the light guide plate 18 on the side close to the LED unit 17D of the LED units 17 is fixed to the chassis 14, the deformation of the light guide plate 18 due to thermal expansion or contraction occurs mainly at the other end close to the other LED unit 17U. Therefore, the follow-up mechanism is not required for the other LED unit 17D and the configuration can be simplified. The other LED unit 17U can be moved by the follow-up mechanism in response to the deformation of the light guide plate 18. Therefore, the relative position between the LED unit 17U and the light entrance surface 18bU is less likely to change.

The light sources are the LED units 17 including the LEDs 17b. When the LEDs 17b are used as light sources, the amount of heat generated by the LEDs 17b tends to be larger than the amount of heat generated by cold cathode tubes or fluorescent tubes. Therefore, the thermal expansion or contraction of the light guide plate 18 tends to be large. The technology described herein is especially useful for such a configuration.

Second Embodiment

Next, the second embodiment of the present invention will be explained with reference to FIGS. 7 and 8. In this embodiment, different guide mechanism components in support members 20A and a chassis 14A are used. Components similar to those of the first embodiment will be indicated with the same symbols followed by letter A. The same configuration, functions and effects will not be explained.

Figure 7:
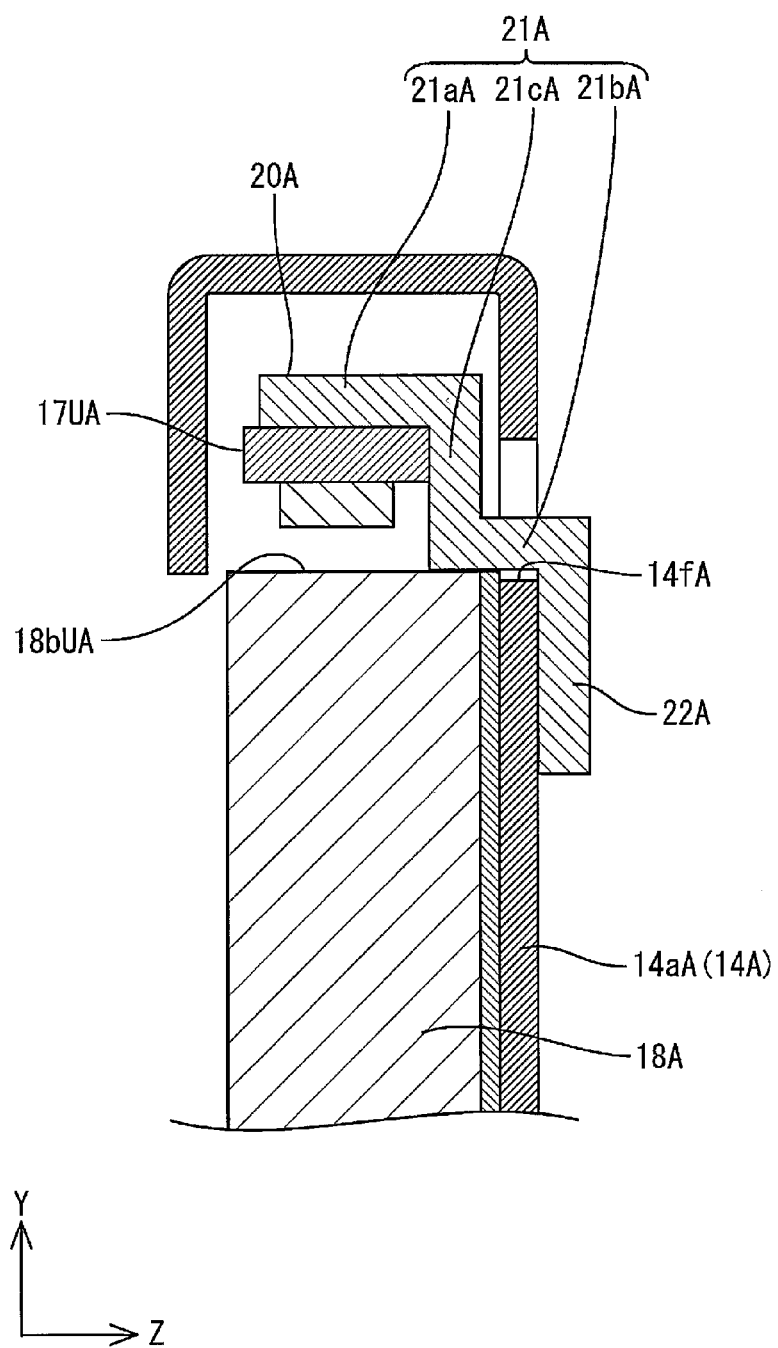
FIG. 7 is a magnified cross-sectional view of a liquid crystal display device along a short side thereof according to the second embodiment of the present invention.

As illustrated in FIG. 7, each support member 20A has a crank-like shape in side view. It includes a main portion 21A and an extending portion 22A. The extending portion 22A projects from an end of the main portion 21A. The main portion 21A includes a pair of horizontal plates 21aA and 21bA along the Z-axis direction and a vertical plate 21cA along the Y-axis direction. The vertical plate 21c is connected to the ends of the horizontal plates 21a and 21b. The front horizontal plate 21aA is attached to a surface of the LED board 17a of the LED unit 17UA. The rear horizontal plate 21bA is in surface contact with the upper surface of the light guide plate 18A and project from the rear of a bottom plate 14aA of the chassis 14A through a guide hole 14fA formed in the bottom plate 14aA. The extending portion 22A project downward from the distal end of the rear horizontal plate 21bA along the vertical direction. The side surfaces of the rear horizontal plate 21bA slide over the inner wall of the guide hole 14fA and the extending portion 22A slides over the rear surface of the bottom plate 14aA of the chassis 14A. Namely, a movement of the support member 20A in the vertical direction is guided.

Figure 8:
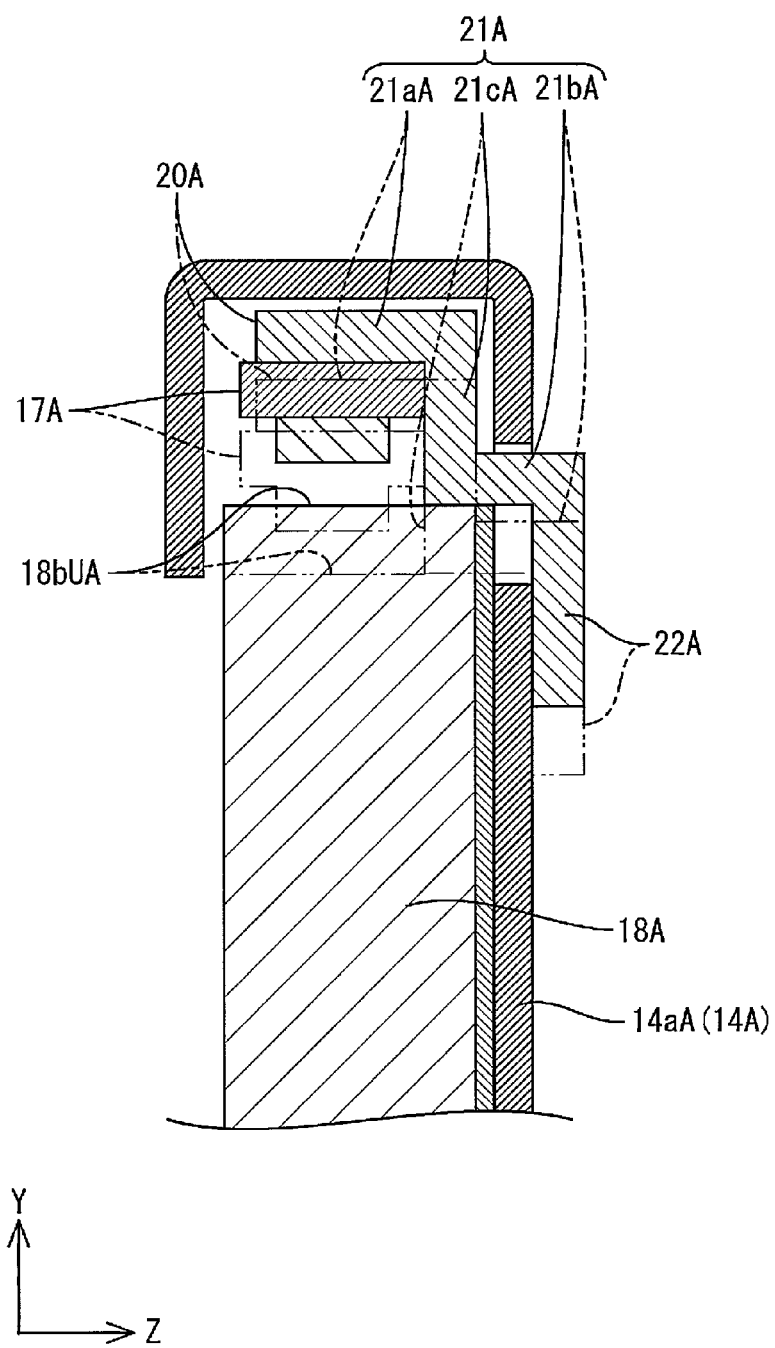
FIG. 8 is a magnified cross-sectional view of the liquid crystal display device in a thermally expanded state along the short side thereof.

When the light guide plate 18A thermally expands from a state indicated by two-dot chain lines in FIG. 8 to a state indicated by solid lines, that is, the upper surface (including a light entrance surface 18bUA) of the light guide plate 18A moves upward, the rear horizontal plates 20bA of the support members 20A are pushed by the upper surface of the light guide plate 18A and moves in the same direction. The support members 20A and the LED unit 17UA move upward by the same amount that the upper surface of the light guide plate 18A moves in response to the movement of the upper surface. At that time, the extending portions 22A slide over the bottom plate 14aA of the chassis 14A and guide pins 22a slide inside the guide holes 14fA. Therefore, the movement is smoothly performed. During the thermal expansion, the vertical relative position between the LED unit 17UA and the light entrance surface 18bUA remains constant. During the thermal contraction, relative position between the LED unit 17UA and the light entrance surface 18bUA also remains constant.

As described above, the guide holes 14fA are formed in the bottom plate 14aA of the chassis 14 in this embodiment. With this configuration, a size of the guide holes 14fA measured when the chassis 14A is placed flat (or a side measuring in the X-axis direction) can be reduced in comparison to the guide holes 14f formed in the side plates 14c of the chassis 14.

Third Embodiment

Next, the third embodiment of the present invention will be explained with reference to FIGS. 9 and 10. In this embodiment, fixing points of a light guide plate 18B and the number of the follow-up mechanisms are different from other embodiments. Components similar to the first embodiment will be indicated with the same symbols followed by letter B. The same configuration, functions and effects will not be explained.

Figure 9:
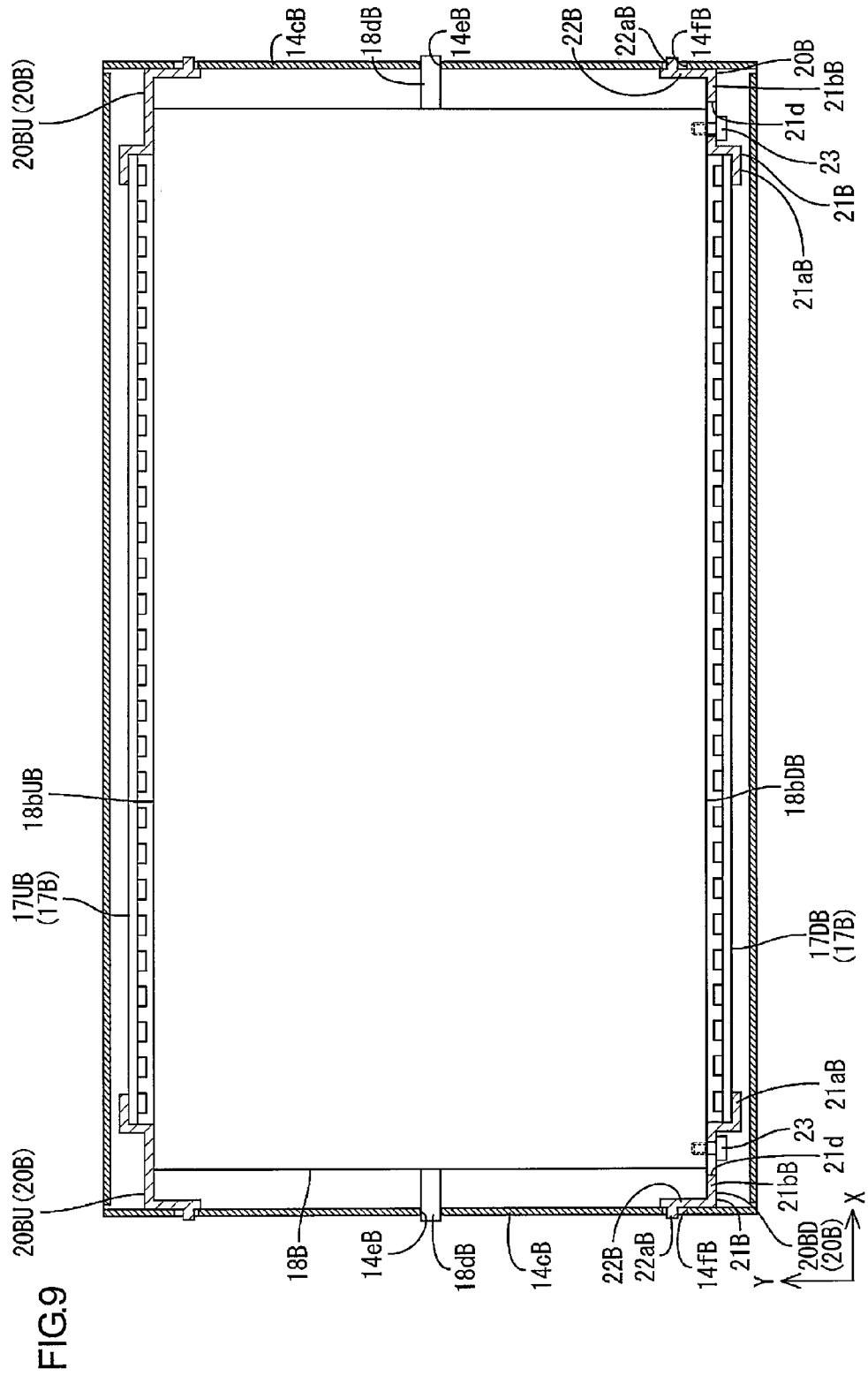
FIG. 9 is a cross-sectional view of a backlight unit according to the second embodiment of the present invention.

As illustrated in FIG. 9, a fixing pin 18dB projects from either short side surface of the light guide plate 18B around the center of the vertical dimension of the short side surface. A fixing hole 14eB for receiving the fixing pin 18dB is formed in either short side plate 14cB of a chassis 14B. When the light guide plate 18B thermally expands or contracts, the upper surface (including a light entrance surface 18bUB) of the light guide plate 18B and the bottom surface (including a light entrance surface 18bDB) move in the vertical direction. They move by substantially the same amount. The upper surface and the bottom surface are located at ends of the vertical dimension of the light guide plate 18B, respectively. The amount that the upper surface and the bottom surface of the light guide plate 18B move in the vertical direction is about a half of the amount that guide plate 18 moves in the first embodiment.

The support members 20B are attached to the upper and the bottom LED units 17B, respectively. To distinguish the support members 20B from each other in the following description, letter U is added to the symbol indicating the upper support members 20B and letter D is added to the symbol indicating the lower support members 20B. When they are explained without distinguishing from each other, those letters are not added. Each upper support member 20BU of the support members 20B has a similar configuration as the support members 20 in the first embodiment and thus the same structures will not be explained. Each lower support member 20BD has a main portion 21B and an extending portion 22B similar to the upper support members 20BU. An inner horizontal plate 21aB of the main portion 21B is attached to the lower LED unit 17DB. An outer horizontal plate 21bB is fixed to the bottom surface of the light guide plate 18B (the lower light entrance surface 18bDB) with screws 23. The bottom surface of the light guide plate 18B is located at the lower end of the vertical dimension of the light guide plate 18B. The outer horizontal plate 21bB is in contact with bottom surface of the light guide plate 18B. Each outer horizontal plate 21bB has an insertion hole 21d that is a through hole in which the screw 23 is inserted. The insertion hole 21d has an oval shape so as to allow a movement of the screw 23 relative to the support member 20B in the X-axis direction. The extending portion 22B of each lower support member 20BD has a guide pin 22aB. The each short side plate 14cB of the chassis 14B has a guide hole 14fB for receiving the guide pin 22aB.

Figure 10:
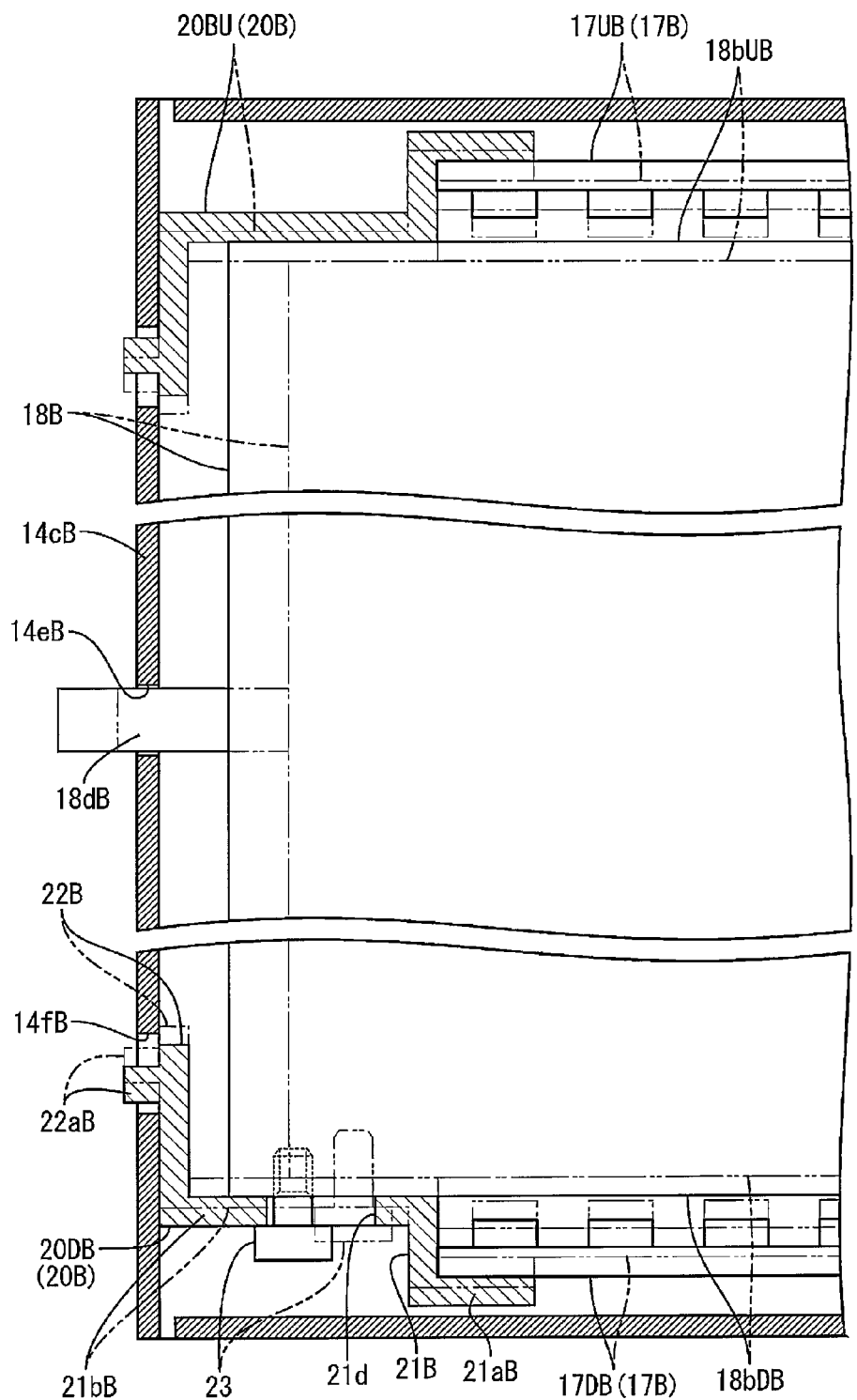
FIG. 10 is a magnified cross-sectional view of the backlight unit in a thermally expanded state.

When the light guide plate 18B is in the state indicated by the two-dot chain lines in FIG. 10 thermally expands, the upper surface (the light entrance surface 18bUB) moves upward and the bottom surface (the light entrance surface 18bDB) of the light guide plate 18B moves downward. As indicated by the solid lines in FIG. 10, the upper support members 20BU are pushed upward by the upper surface of the light guide plate 18B and the lower support members 20BD fixed to the light guide plate 18B with the screws 23 move downward together with the bottom surface of the light guide plate 18B. As a result, the support members 20B and the LED units 17B move in the vertical direction by the amounts that the upper surface and the bottom surface of the light guide plate 18B, respectively, in response to the movements of the upper and the bottom surfaces. The movements of the support members 20B are smoothly guided by the guide pins 22aB and the guide holes 14fB. During the thermal expansion, a vertical relative position between the upper LED unit 17UB and the light entrance surface 18bUB that faces the upper LED unit 17UB remains constant. A vertical relative position between the lower LED unit 17DB and the light entrance surface 18bDB that faces the lower LED unit 17DB also remains constant. During the thermal contraction, the vertical relative positions between the LED units 17B and the respective light entrance surfaces 18bB also remain constant.

As described above, the middle section of the light guide plate 18 between the LED units 17B is fixed to the chassis 14B. Both LED units 17B can be moved by the follow-up mechanism. Because the middle section of the light guide plate 18B between the LED units 17B is fixed to the chassis 14B, the light guide plate 18B is stably fixed.

The support members 20B are fixed to the light guide plate 18B. Because the support members 20B are fixed to the light guide plate 18B, the follow-up movement of the support members 20B in response to the movement of the light guide plate 18B is further stabilized.

Other Embodiments

The present invention is not limited to the above embodiments explained in the above description. The following embodiments may be included in the technical scope of the present invention, for example.

(1) A modification of the above embodiments includes that support members supporting the upper LED unit fixed to the light guide plate with fixing members such as screws used in the third embodiment. In that case, the support members are not necessary to be in contact with the upper surface of the light guide plate. For example, the support members separated from the upper surface of the light guide plate may be included in the technical scope as long as the support members are fixed so as to be in contact with the side surfaces of the light guide plate.

(2) The fixing of the support members to the light guide plate may be implemented not only by the screws used in the third embodiment, that is, a mechanical method but also by a chemical method such as bonding by adhesives and welding in which contact surfaces are melted and mated.

(3) The fixing points of the light guide plate to the chassis can be altered from those in the above embodiments as necessary. For example, fixing pins may be provided at the upper end of the light guide plate, or the fixing pins in the above embodiments may be provided at different vertical points.

(4) In the above embodiments, the light guide plate has the fixing pins and the chassis has the fixing holes. However, the light guide plate may have fixing holes or fixing recesses and the chassis may have fixing pins. The chassis may have fixing recesses that do not extend through the side plates instead of the fixing holes.

(5) The fixing members for fixing the light guide plate to the chassis can be altered as necessary. For example, they may be fixed together by a chemical method such as bonding by adhesives and welding in which contact surfaces are melted and mated. By limiting the fixing point in the arrangement direction (the vertical direction), in which the LED unit and the light entrance surface are arranged, to one, two-dimensional deformation of the light guide plate due to thermal expansion or contraction is allowed.

(6) In the above embodiments, the guide mechanism includes the guide pins provided in the support members and the guide holes in the chassis. However, pins and holes may be provided in the other way around. Namely, the guide mechanism may include guide holes in the support members and guide pins on the chassis. In that case, the guide holes in the support members may be through holes or recesses that do not extend through the support members.

(7) In the above embodiments, the guide mechanism includes the guide pins in cylindrical shapes and the guide holes formed in oval shapes. However, the shapes or the sizes of the guide pins and the guide holes can be altered as necessary.

(8) In the above embodiments, the extending portions having the guide pins, which are a part of the guide mechanism, slide over the side plates of the chassis. However, the extending portions may not be in contact with the side plates.

(9) In the above embodiments, the support members and the chassis are made of the same material. However they may be made of different materials. For example, the support members and the chassis may be made of different kinds of metals, or made of different kinds of resins. The support members may be made of metal and the chassis are made of resin, or the other way around.

(10) In the above embodiments, the support members are made of metal having the coefficient of thermal expansion lower than that of the light guide plate. However the support member may be made of resin having a coefficient of thermal expansion similar to that of the light guide plate.

(11) In the above embodiments, the LED units are arranged on the upper side and the lower side of the light guide plate. However, only one LED unit may be provided. If the fixing points of the light guide plate to the chassis cannot be set at positions near the LED unit, a significant technical meaning of using the follow-up mechanism can be recognized.

(12) In the above embodiments, the LED units are arranged so as to face each other. However, the LED unit may be arranged on the sides of the light guide plate at ends of the horizontal dimension of the light guide plate and another LED unit may be arranged on the upper side (or the lower side) of the light guide plate.

(13) In the above embodiments, a pair of the LED units is provided. However, three ore more LED units may be provided.

(14) In the above embodiments, the LED boards in the LED units are made of metal. However, the LED boards may be made of resin.

(15) In the above embodiments, the LED units including the LEDs are used as light sources. However, discharge tubes such as cold cathode tubes and hot cathode tubes (linear light sources or tubular light sources) may be used.

(16) In the above embodiment, the liquid crystal panel is held in the vertical position with the short-side direction thereof aligned with the vertical direction. However, the liquid crystal panel may be held in the vertical position with the long-side direction thereof aligned with the vertical direction.

(17) In the above embodiments, the TFTs are used as switching components of the liquid crystal display device. However, the technology described herein can be applied to liquid crystal display devices using switching components other than TFTs (e.g., thin film diodes (TFDs)). Furthermore, it can be applied to white-and-black liquid crystal display devices other than the color liquid crystal display device.

(18) In the above embodiments, the liquid crystal display device including the liquid crystal panel as a display component is used. However, the present invention can be applied to display devices including other types of display components.

(19) In the above embodiments, the television receiver TV including the tuner T is used. However, the technology can be applied to a display device without the tuner T.

The invention claimed is:
1. A lighting device, comprising:
at least one light source;
a light guide member including a light entrance surface facing the light source and a light exit surface along an arrangement direction in which the light source and the light entrance surface are arranged; and
a follow-up mechanism configured to move the light source in the arrangement direction in response to a deformation of the light guide member; wherein:
the follow-up mechanism includes a support member supporting the light source and being in contact with a surface of the light guide member along the light entrance surface;
the lighting device further comprises:
a chassis housing the light source and the light guide member; and
a guide mechanism including a portion provided in the chassis and a portion provided in the support member, and configured to guide a movement of the support member relative to the chassis;
the guide mechanism includes a first mating portion provided in the support member and a second mating portion provided in the chassis so as to mate with the first mating portion and to have a clearance relative to the first mating portion in the arrangement direction;
the chassis includes a bottom plate arranged on a side opposite from the light exit surface with respect to the light guide member and a side plate rising from an outer edge of the bottom plate; and
the second mating portion is provided in the side plate.

2. A lighting device, comprising:
at least one light source;
a light guide member including a light entrance surface facing the light source and a light exit surface along an arrangement direction in which the light source and the light entrance surface are arranged; and
a follow-up mechanism configured to move the light source in the arrangement direction in response to a deformation of the light guide member; wherein:
the follow-up mechanism includes a support member supporting the light source and being in contact with a surface of the light guide member along the light entrance surface;
the lighting device further comprises:
a chassis housing the light source and the light guide member; and
a guide mechanism including a portion provided in the chassis and a portion provided in the support member, and configured to guide a movement of the support member relative to the chassis;
the guide mechanism includes a first mating portion provided in the support member and a second mating portion provided in the chassis so as to mate with the first mating portion and to have a clearance relative to the first mating portion in the arrangement direction;
the chassis includes a bottom plate arranged on a side opposite from the light exit surface with respect to the light guide member and a side plate rising from an outer edge of the bottom plate; and
the second mating portion is provided in the bottom plate.

3. A lighting device, comprising:
at least one light source;
a light guide member including a light entrance surface facing the light source and a light exit surface along an arrangement direction in which the light source and the light entrance surface are arranged; and
a follow-up mechanism configured to move the light source in the arrangement direction in response to a deformation of the light guide member; wherein:
the follow-up mechanism includes a support member supporting the light source and being in contact with a surface of the light guide member along the light entrance surface;
the lighting device further comprises:
a chassis housing the light source and the light guide member; and
a guide mechanism including a portion provided in the chassis and a portion provided in the support member, and configured to guide a movement of the support member relative to the chassis;
the guide mechanism includes a first mating portion provided in the support member and a second mating portion provided in the chassis so as to mate with the first mating portion and to have a clearance relative to the first mating portion in the arrangement direction;
the first mating portion is a protrusion; and
the second mating portion is a recess formed so as to receive the first mating portion.

4. The lighting device according to claim 1, wherein the support member is made of same material as that of the chassis.

5. The lighting device according to claim 1, wherein the support member is made of material having a coefficient of thermal expansion lower than that of the light guide member.

6. The lighting device according to claim 1, wherein:
the at least one light source includes a pair of light sources arranged so as to face each other and to sandwich the light guide member; and
the light guide member has a pair of light entrance surfaces facing the respective light sources.

7. The lighting device according to claim 6, wherein:
an end of the light guide plate close to one of the light sources is fixed to the chassis housing the light sources and the light guide member; and
the follow-up mechanism is configured to move the other one of the light sources.

8. The lighting device according to claim 6, wherein:
a middle section of the light guide plate between the light sources is fixed to the chassis housing the light sources and the light guide member; and the follow-up mechanism is configured to move both light sources.

9. The lighting device according to claim 2, wherein the support member is made of same material as that of the chassis.

10. The lighting device according to claim 2, wherein the support member is made of material having a coefficient of thermal expansion lower than that of the light guide member.

11. The lighting device according to claim 2, wherein:
the at least one light source includes a pair of light sources arranged so as to face each other and to sandwich the light guide member; and
the light guide member has a pair of light entrance surfaces facing the respective light sources.

12. The lighting device according to claim 11, wherein:
an end of the light guide plate close to one of the light sources is fixed to the chassis housing the light sources and the light guide member; and
the follow-up mechanism is configured to move the other one of the light sources.

13. The lighting device according to claim 11, wherein:
a middle section of the light guide plate between the light sources is fixed to the chassis housing the light sources and the light guide member; and
the follow-up mechanism is configured to move both light sources.

14. The lighting device according to claim 3, wherein the support member is made of same material as that of the chassis.

15. The lighting device according to claim 3, wherein the support member is made of material having a coefficient of thermal expansion lower than that of the light guide member.

16. The lighting device according to claim 3, wherein:
the at least one light source includes a pair of light sources arranged so as to face each other and to sandwich the light guide member; and
the light guide member has a pair of light entrance surfaces facing the respective light sources.

17. The lighting device according to claim 16, wherein:
an end of the light guide plate close to one of the light sources is fixed to the chassis housing the light sources and the light guide member; and
the follow-up mechanism is configured to move the other one of the light sources.

18. The lighting device according to claim 16, wherein:
a middle section of the light guide plate between the light sources is fixed to the chassis housing the light sources and the light guide member; and
the follow-up mechanism is configured to move both light sources.

* * * * *

UNITED STATES PATENT AND TRADEMARK OFFICE
CERTIFICATE OF CORRECTION

PATENT NO. : 8,794,779 B2  
APPLICATION NO. : 13/142293  
DATED : August 5, 2014  
INVENTOR(S) : Keiji Hayashi Page 1 of 1

It is certified that error appears in the above-identified patent and that said Letters Patent is hereby corrected as shown below:

The following should be added to item (30) the Foreign Application Priority Data on the title page of the Patent:

Jan 13, 2009 (JP)................2009-004538

Signed and Sealed this
Sixteenth Day of June, 2015

Michelle K. Lee
*Director of the United States Patent and Trademark Office*